United States Patent [19]

Stark et al.

[11] Patent Number: 5,596,177
[45] Date of Patent: Jan. 21, 1997

[54] BUSHING FOR MULTIPLE SIZED AND SHAPED HOLES IN STRUCTURAL MEMBERS

[75] Inventors: Thomas S. Stark, Coral Springs, Fla.; Thomas J. Gretz, Clarks Summit, Pa.

[73] Assignee: Arlington Industries, Inc, Scranton, Pa.

[21] Appl. No.: 501,951

[22] Filed: Jul. 31, 1995

Related U.S. Application Data

[63] Continuation of Ser. No. 135,804, Oct. 13, 1993, abandoned.
[51] Int. Cl.⁶ ............................... H01B 17/26; F16L 5/00
[52] U.S. Cl. ................... 174/153 R; 174/153 G; 16/2
[58] Field of Search .................. 174/153 R, 65 R, 174/65 G, 135, 151, 152 G, 153 G; 248/56, 27.1; 24/713.6; 29/443, 525.1, 453; 16/2; 8/356, 394, 395, 396

[56] References Cited

U.S. PATENT DOCUMENTS

| | | | |
|---|---|---|---|
| 2,912,712 | 11/1959 | Shamban et al. | 174/153 G X |
| 3,562,847 | 2/1971 | Jemison | 174/153 G X |
| 3,887,960 | 6/1975 | Sherman | 16/2 |
| 4,262,181 | 4/1981 | Tutano et al. | 248/27.1 X |
| 4,520,976 | 6/1985 | Couvnoyer et al. | 174/153 G X |
| 4,869,454 | 9/1989 | Byrne et al. | 174/153 G X |

*Primary Examiner*—Hyung S. Sough

[57] ABSTRACT

A self-backing cable bushing for offsetting an electrical conduit passing through a knock out or opening in a structural member. The bushing has face and backing flanges connected by a living hinge. An annular tubular projection with peripheral ramp lugs extends from the face flange. The cable bushing may be installed by locating the face and backing flanges on opposite sides of the knock out and inserting the ramp lugs into the circular hole in the backing. This face retains backing flange in parallel, closely-spaced relation with the surface of offset between them. The bushing may thus be used to protect an electrical conduit from contacting the edges of a variety of knock out shapes.

6 Claims, 11 Drawing Sheets

BUSHING FOR MULTIPLE SIZED AND SHAPED HOLES IN STRUCTURAL MEMBERS

This is a continuation of application Ser. No. 08/135,804 filed on Oct. 13, 1993, now abandoned.

BACKGROUND OF THE INVENTION

1. Field of the Invention

The invention relates to cable bushings for offsetting electrical cables. Electrical cables passing through openings in structural members such as framing panels, or walls must be protected from abrasive contact with the edges of the openings. Offset bushings prevent direct contact between the electrical cable and these edges.

2. Description of the Prior Art

Cable bushings have been used for protecting electrical conduits passing through openings in structural members from abrasion. This has required that the bushings prevent contact of the electrical conduit with exposed edges of the opening and that they be anchored at the opening. Where the knock out opening has been of uniform and regular shape, it has been possible to provide matching-contour insertable bushings, as shown for example in U.S. Pat. Nos. 2,912,712 and 4,520,976.

A major limitation to this approach has arisen in cases where the opening or knock-out in the structural member is of an irregular configuration such as keyhole-shaped and the provision of a geometrically conforming bushing would entail the fabrication of a geometrically and structurally complex part at substantial expense. Another major limitation of the prior art approach has been the inability of the matching-contour insertable bushings to accommodate non-uniformities in the dimensions of the opening. Yet another major limitation has arisen where a variety of geometric-shape openings in structural members must be provided with conforming bushings, necessitating that supplies of a variety of bushings be provided. Thus, the cable bushings of the prior art have not proven fully satisfactory.

SUMMARY OF THE INVENTION

Accordingly, it is a primary object of this invention to provide an improved cable bushing overcoming many of the problems and disadvantages associated with prior cable bushings.

It is a further object of the invention to provide a self-backing cable bushing of unitary, lightweight construction adaptable to fit a variety of knock out opening shapes.

It is a yet further object of the invention to provide a self-backing cable bushing which is convenient to use and inexpensive to fabricate.

These and other objects are accomplished within the present invention by providing a self-backing cable bushing for offsetting an electrical conduit. The bushing has molded face and backing flanges connected by an integrally-molded living hinge. The face flange has a generally polygonal, oversized flange integrally molded with a perpendicular, tubular projection. This tubular projection has radially deformable ramp lugs at its periphery. The backing member is also a generally polygonal, oversized flange and has a circular hole with diameter less than cylindrical projection diameter across the ramp lugs. The bore may be chamfered.

In use, the backing flange or the bushing is passed through an irregularly-shaped opening in the structural member. The living hinge is then bent to align the cylindrical projection with the bore. Assembly is completed by pushing the cylindrical projection into the chamfered bore thereby deforming the ramp lugs until the ramps pass through the bore and expand beyond the backing member distal side. Thus, face and backing flanges are held in parallel, closely-spaced relation with the structural member between them. The tubular projection forms a passage through which the electrical conduit passes with offset from the rough or uneven edges of the knock out.

These and other objects, advantages, and features of the intention will appear more fully from the following description made in conjunction with the accompanying drawings wherein like reference labels refer to same or similar parts throughout the several views.

DETAILED DESCRIPTION OF THE PREFERRED EMBODIMENTS

Figure 1:
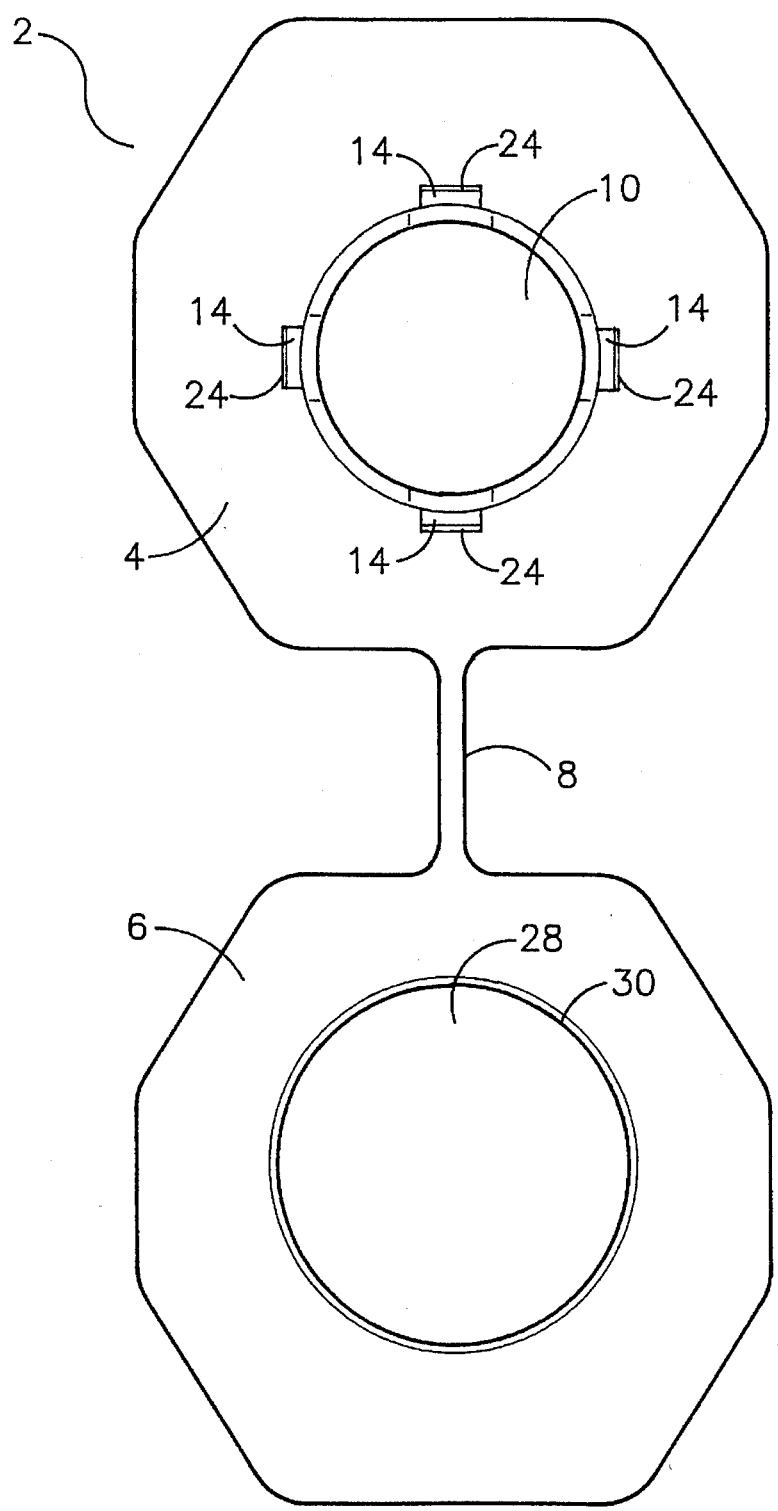
FIG. 1 is a plan view of the cable bushing front.
Figure 2:
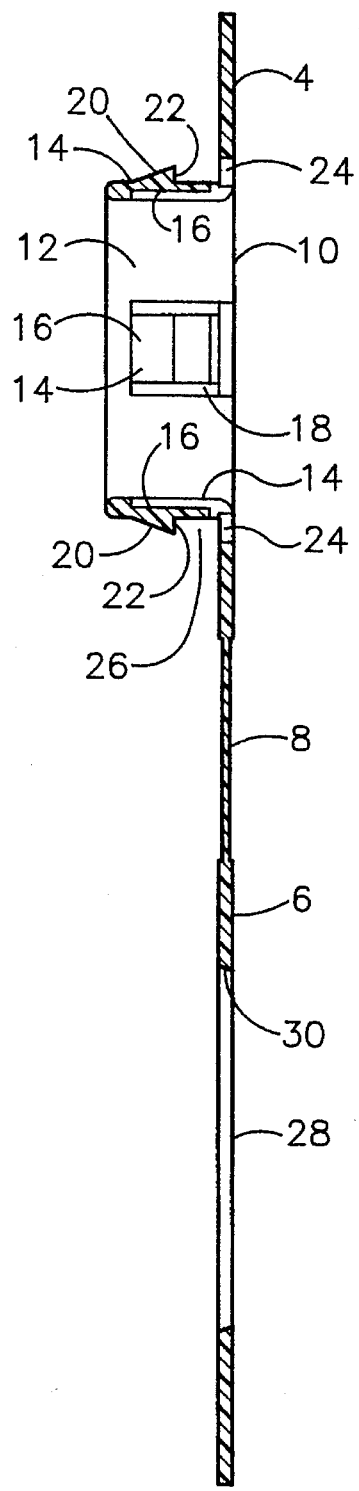
FIG. 2 is a sectional view to the right along the axis of symmetry of the cable bushing front as shown in FIG. 1.
Figure 3:
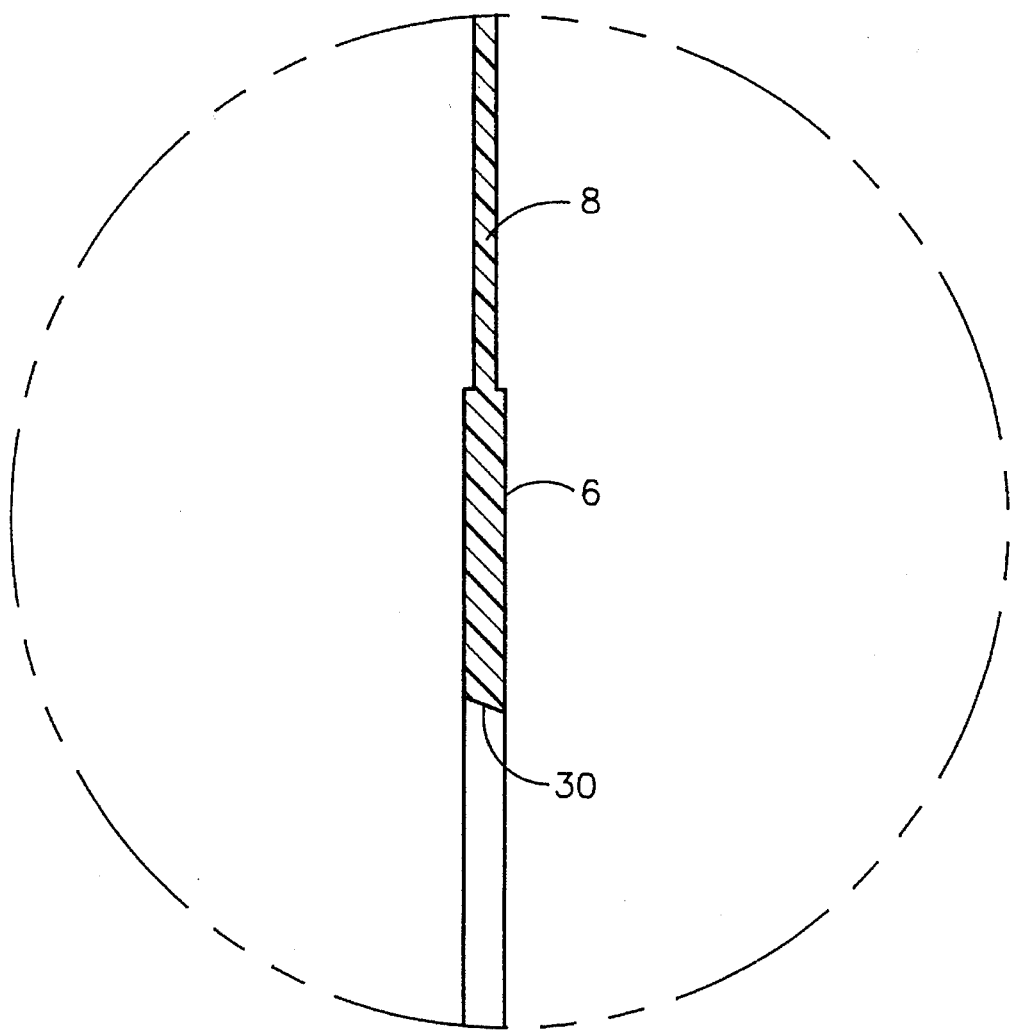
FIG. 3 is a detail enlargement of a portion of FIG. 2.

FIGS. 1–3 illustrate the self-backing cable bushing 2. The bushing includes a face flange 4 and a backing flange 6 both of generally polygonal configuration. As shown in FIG. 1, both backing flange 6 and face flange 4 are preferably of symmetric octagonal external configuration with rounded edges but may be fashioned of other equivalent polygonal or round configuration as will be readily understood by artisans of this field. Preferably a living hinge 8 or a functionally equivalent jointed hinge connects the face flange 4 and the backing flange 6 and helps to associate the two during manufacture and shipping and prior to and during assembly in use. The entire bushing 2 is preferably integrally made of a lightweight nonmetallic material or a molded plastic material of polymeric type such as polypropylene which offers corrosion resistance and is electrically non-conductive.

As shown in FIGS. 1 and 2, the face flange 4 has a circular hole 10 from which extends a tubular projection 12 provided with plural circumferentially deployed ramp lugs 14. As further illustrated in FIGS. 2 and 5 each of the lugs 14 comprises a resilient finger 16 surrounded by a U-shaped marginal slot 18. These U-shaped marginal slots 18 along with tab slots 24 in the face flange 4 permit each of the fingers 16 to be elastically displaced laterally towards the tubular projection's 12 axis. Each finger 16 has an integral ramp 20 inclined laterally of and away from the tubular body 12 axis towards the face flange 4. The ramp 20 end drops to the resilient finger 16 to form a radial cam surface 22. The cam surfaces 22 together with the back of the face flange 4, the outer peripheries of the fingers 14 and the periphery of tubular projection 12 together define a circumferential recess 26 around tubular projection 12.

As illustrated in FIGS. 1–3, the backing flange 6 has a circular hole 28 with a chamfered edge 30 of median diameter between twice the greatest radial extent of the ramp lugs 14 and the external diameter of the tubular projection 12. As will be apparent to an artisan of skill in the art, both the tubular projection 12 and the hole 28 may equivalently be made in a noncircular shape.

Figure 4:
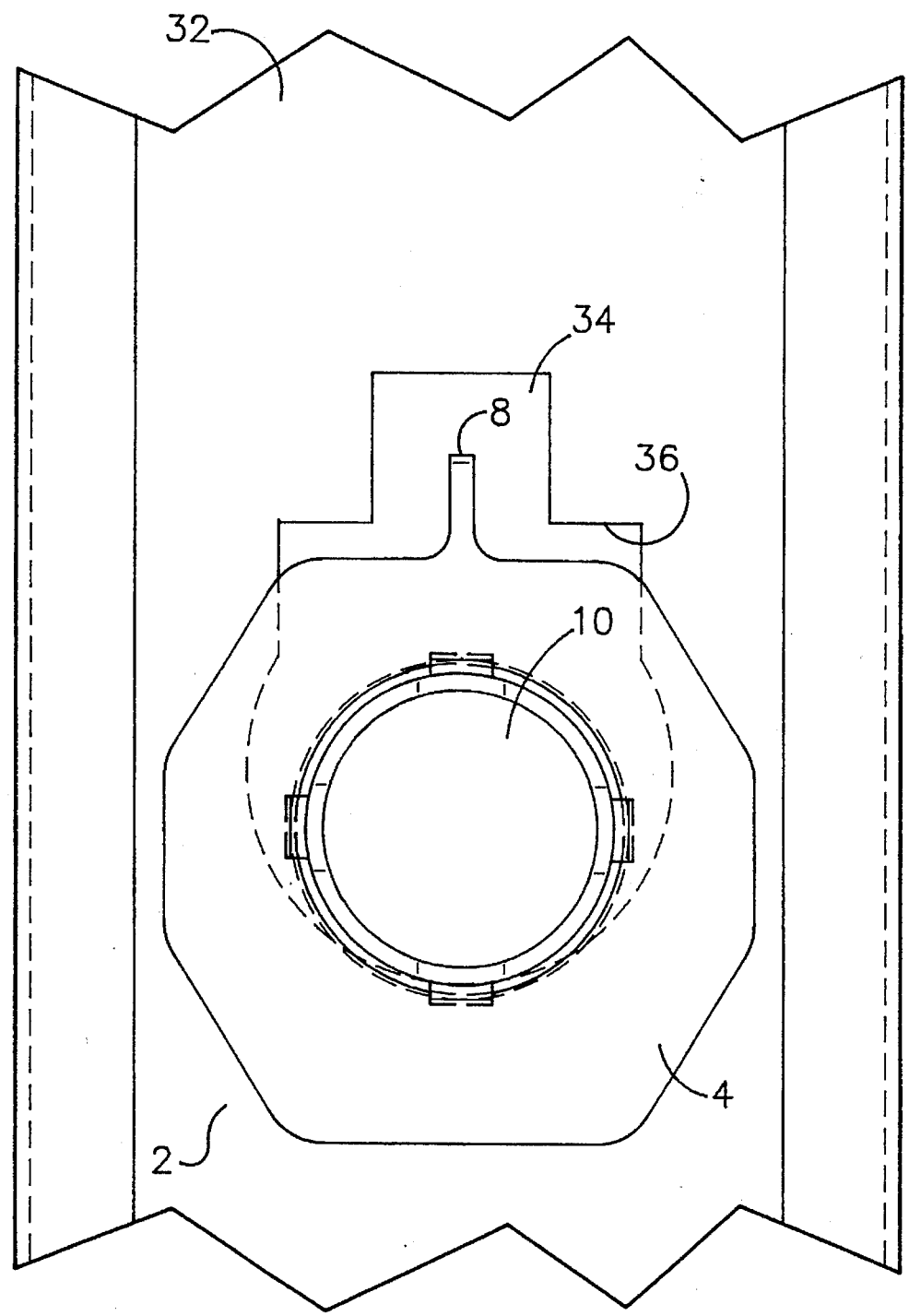
FIG. 4 is a plan view of the assembled bushing front in a structural member opening.
Figure 5:
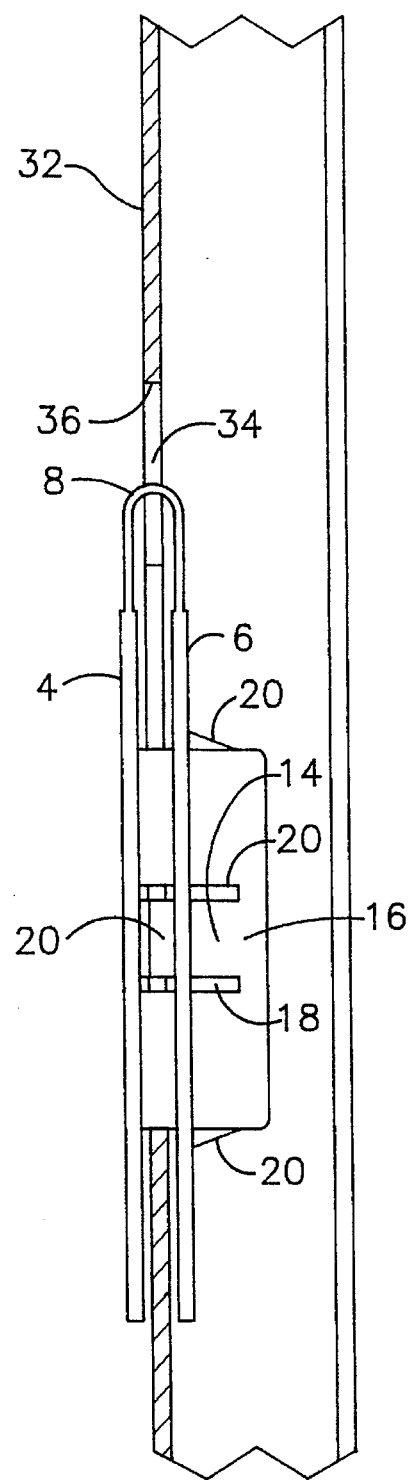
FIG. 5 is a side view of the assembled bushing of FIG. 4 from the left, with the structural member in section.
Figure 6:
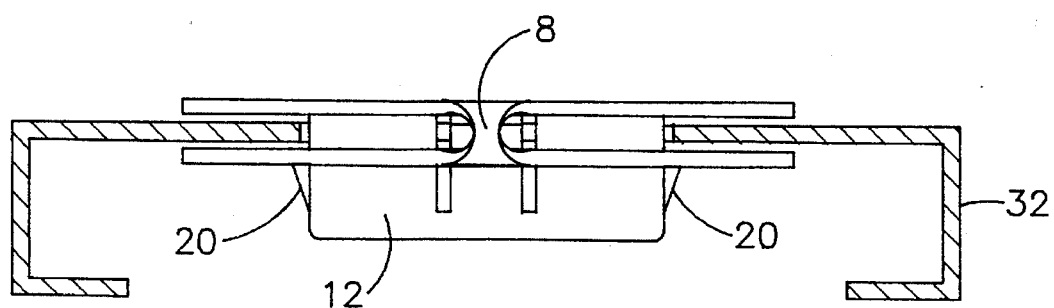
FIG. 6 is a top view of the assembled bushing of FIG. 4 from the top, with the structural member in section.

In use, the self-backing cable bushing 2 may be attached as shown in FIGS. 4–6 to provide an offset for an electrical conduit passed through a knock out 34 in a thin structural member 32. The thin structural member may comprise a framing member as shown, or a similar thin panel or wall. The knock out 34 has an irregular shape with an exposed edge 36. In order to prevent direct contact between this exposed edge 36 and the electrical conduit passed through the knock out 34, the self-backing cable bushing 2 is situated so that the face flange 4 overlaps the knock out 34 marginal rim portion on one side of the structural member 32. The tubular projection 12 extends through knock out 34. With the living hinge 8 passed through the knock out 34 and folded, the backing flange 6 is brought into proximity with the opposite side of structural member 32 to overlap the knock out 34 marginal rim portion on the opposite side.

In this relation, when the axis of tubular projection 12 aligns with the axis of backing flange hole 28, a relatively light pressure such as a finger squeezing of face and backing flange bodies 4 and 6 pushes the tubular projection 12 into backing flange 6 hole 28. Tubular projection 12 enters hole 28 until ramps 20 engage with chamfer 30. Further entry of tubular projection 12 into hole 28 elastically deforms resilient fingers 16 laterally of and towards the tubular projection's 12 axis so that the entirety of ramps 20 passes through hole 28. Resilient fingers 16 then elastically return to their undeformed state and the back of backing flange 6 engages cam surfaces 22. In this assembled state, backing flange 6 rests in circumferential recess 26 between the opposite side of structural member 32 wall and the cam surfaces 22. Folded living hinge 8 provides a biasing force tending to retain the backing flange 6 against cam surfaces 22.

As seen in FIG. 4, completion of this assembly provides a bushing-surrounded circular passage 10 ready for receiving an electrical conduit passing through the knock out 34. The oversized face 4 and backing 6 flanges retain the self-backing bushing 2 in the knock out 34. Thus, the electrical conduit is prevented from contacting exposed edges 36 of the knock out 34 by the inner periphery of tubular projection 12. This helps prevent damage to the conduit at the passage through structural member 32.

FIG. 7 again shows the self-backing cable bushing assembled in a structural member 32 which has a smaller, rectangular knock out 38. The living hinge 8 connection between face flange 4 and backing flange 6 allows the backing flange 6 to be easily manipulated and turned to position permitting passage through knock out 38. As will be readily comprehended by artisans of the field, the backing flange 6 may, when necessary, be elastically deformed to permit it to pass through smaller-sized knock out openings. Rounded edges or corners on the flange 6 further facilitate such a forced passage.

Figure 7:
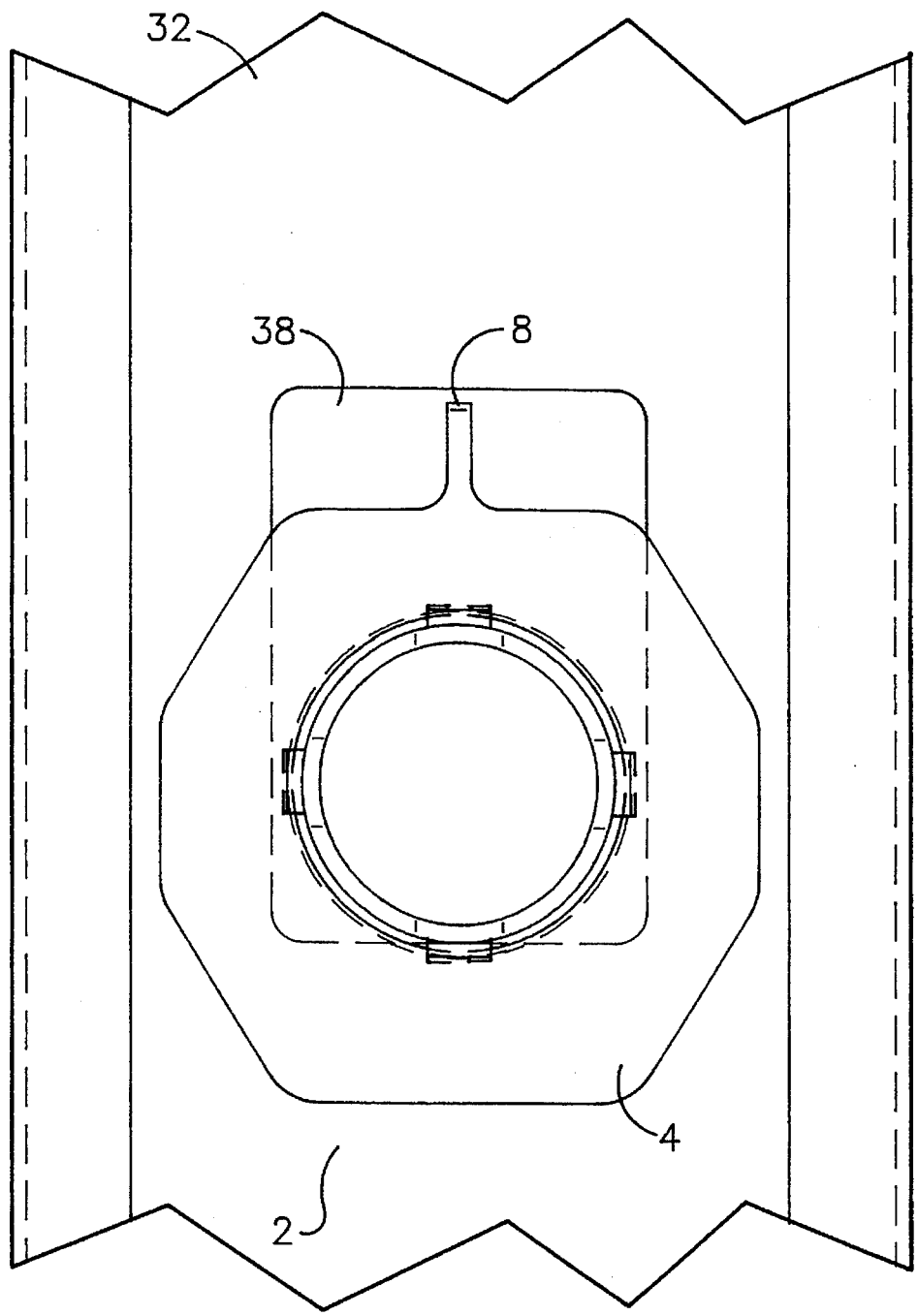
FIG. 7 is a plan view of the assembled bushing front in a structural member opening of first alternative configuration.
Figure 8:
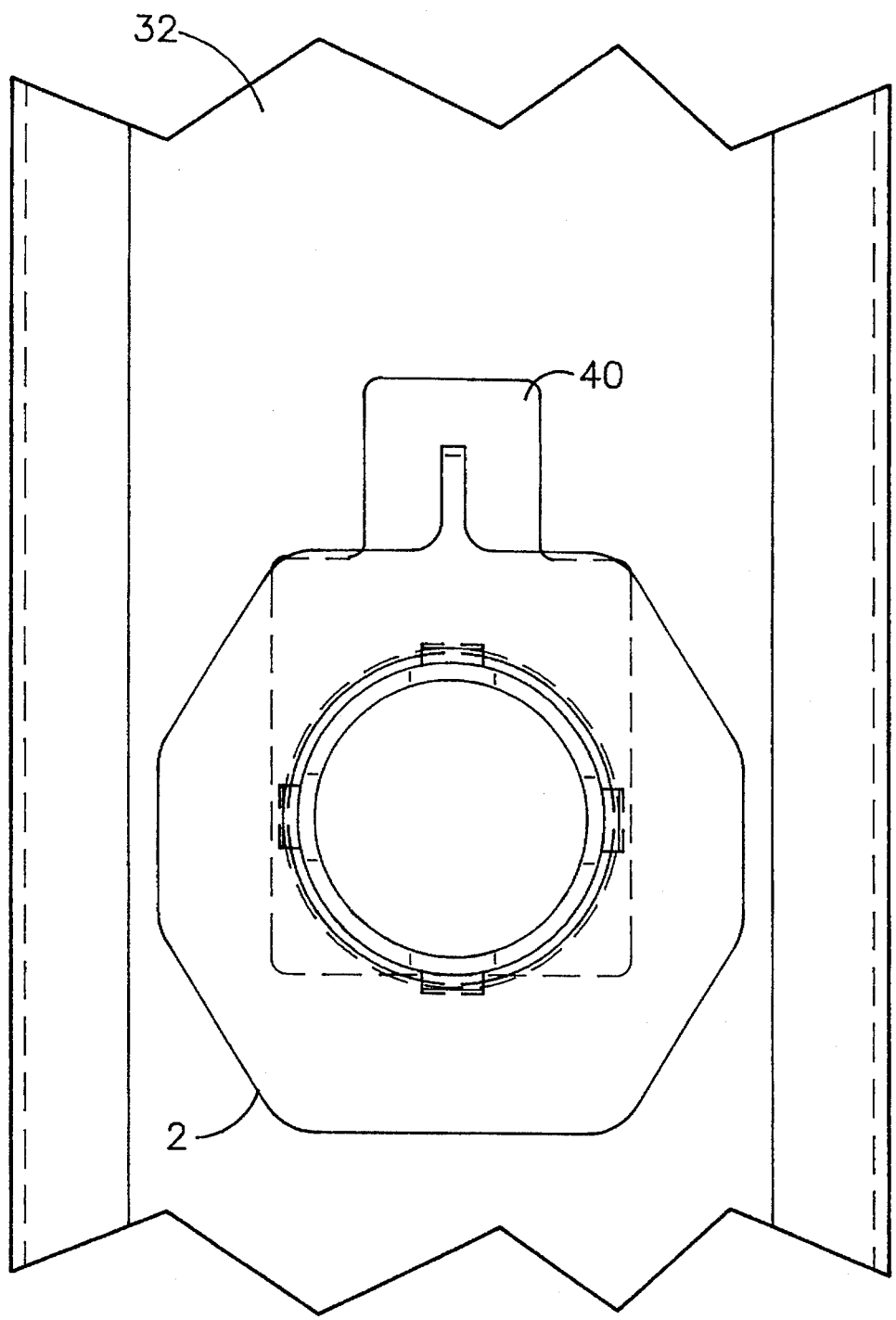
FIG. 8 is a plan view of the assembled bushing front in a structural member opening of second alternative configuration.
Figure 9:
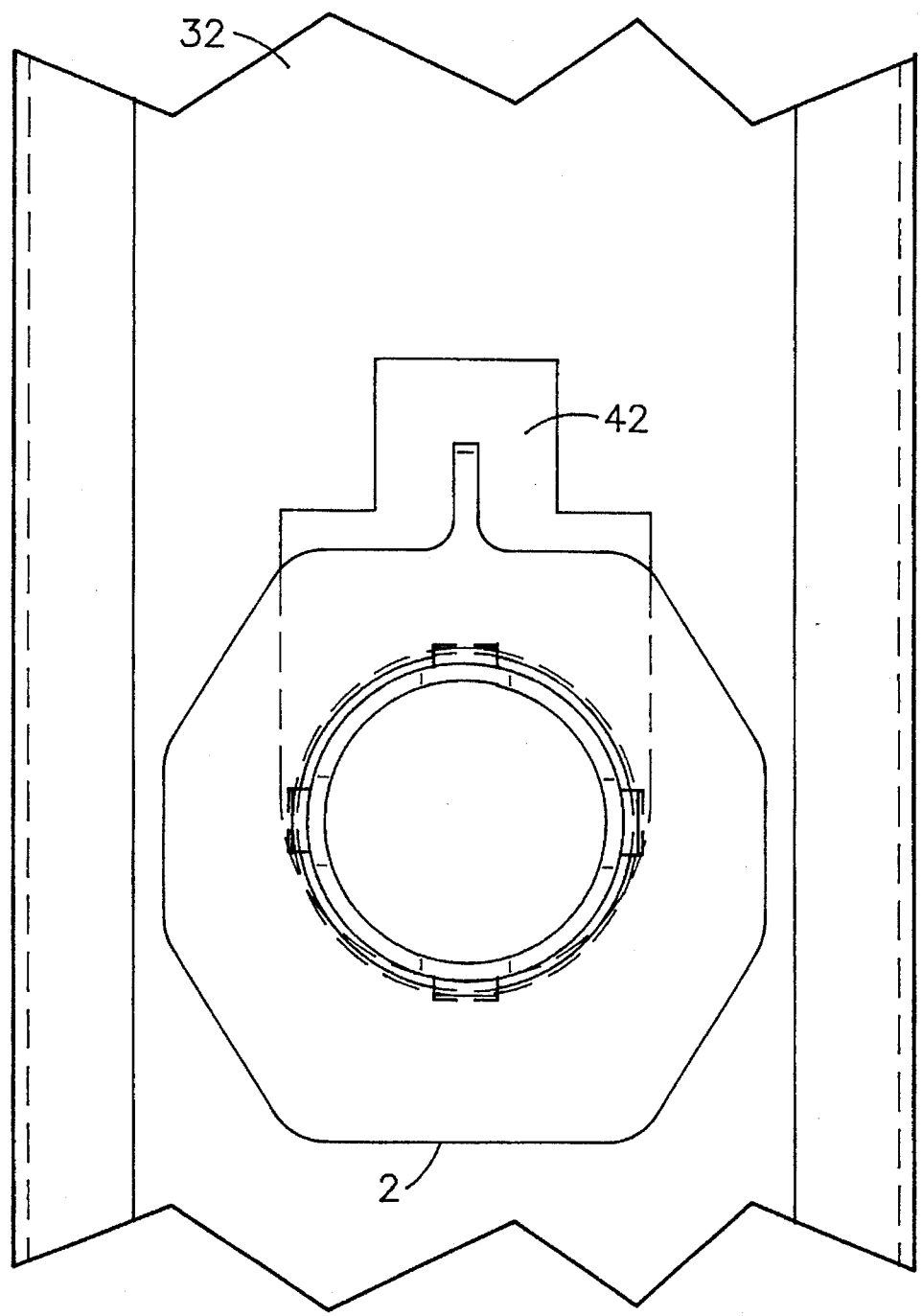
FIG. 9 is a plan view of the assembled bushing front in a structural member opening of third alternative configuration.

As illustrated in FIGS. 7–9, an important advantage of the invention lies in the fact that the cable bushing 2 is self-backing and thus may be applied to a wide variety of knock out passage shapes without the limitation of attaching to only one knock out configuration. In FIG. 8 the self-backing cable bushing 2 is assembled in a rectangular keyhole-shaped opening 40 in structural member 32. In FIG. 9 the cable bushing is assembled in semi-circular keyhole-shaped opening 42 in structural member 32. FIGS. 7–9 along with FIG. 4 help illustrate the adaptability of the self-backing cable bushing 2 to fit a large range of knock out shapes.

Figure 10:
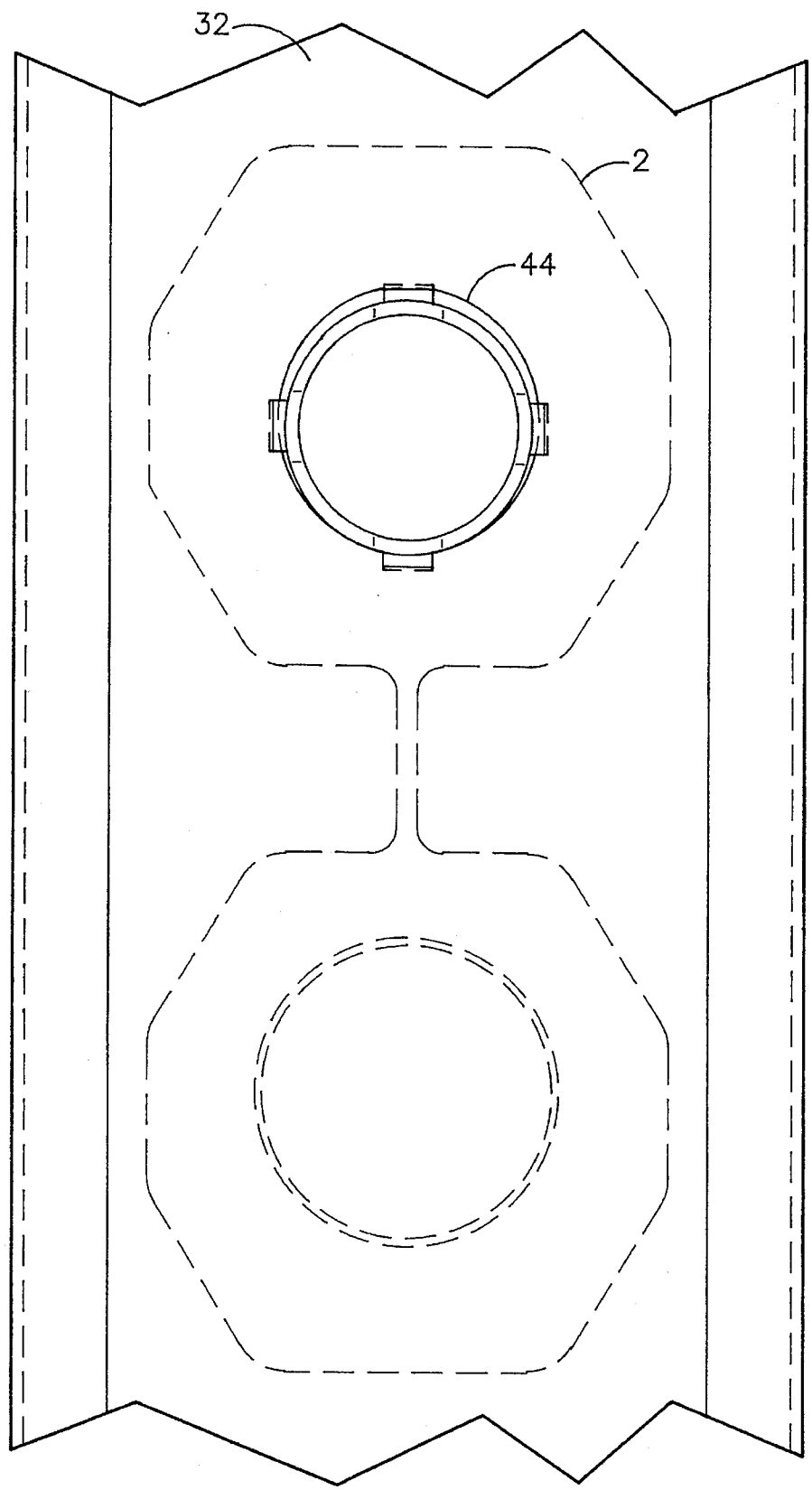
FIG. 10 is a plan view of the bushing front inserted in a structural member opening of fourth alternative configuration.
Figure 11:
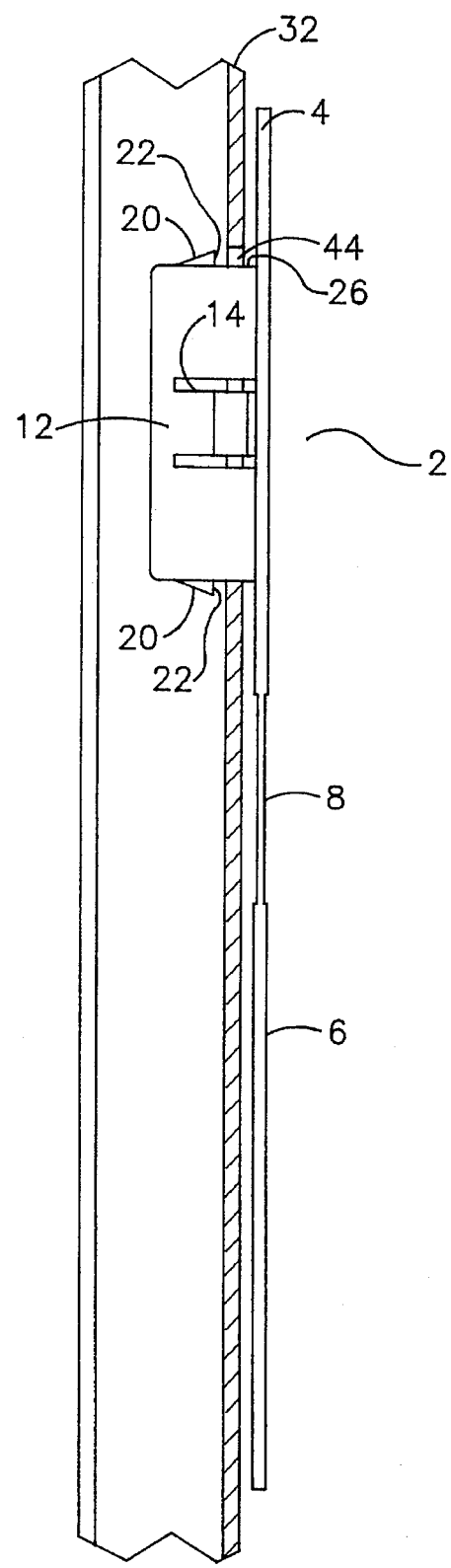
FIG. 11 is a partial section view from the side showing the structural member in section and the bushing inserted in the opening.

FIG. 10 illustrates use of the cable bushing 2 with a knock out opening 44 of circular or near-circular shape and approximately the same size as the circular hole 28 of the backing flange 6. This knock out opening is too small for backing flange 6 and living hinge 8 to pass through. However, its size permits it to retain the bushing 2 by direct passage of tubular projection 12 therethrough. As shown in FIG. 11, the cam surfaces 22 prevent pull-out of tubular projection 12 and retain the opening 44 edge in circumferential recess 26. As will be well understood by artisans in the art, backing flange 6 may optionally be disassociated from face flange 4 by severing living hinge 8. The backing flange may then be assembled over ramp lugs 14 on the opposite side of the structural member 32. This is also possible where the knock out 44 is overly large and fails to permit sufficient cam surfaces 22 to engage the structural member 32 to retain face flange 4 and tubular projection 12 in the knock out 44.

Disassembly of the bushing 2 from a structural member may be effected by manually deforming resilient fingers 16 laterally of and towards the tubular projection's 12 axis so that the ramps 20 and tubular projection 12 may be manually withdrawn from backing flange hole 28 or a structural member hole 44.

It will therefore be seen that the invention provides a self-backing cable bushing of unitary lightweight construction for offsetting an electrical conduit passing through a structural member knock out having irregular configuration. The preferred embodiments of the invention having been described, it should be understood that various changes, adaptations, and modifications may be made therein without departing form the spirit of the invention and the scope of the claims.

We claim:

1. A bushing for multiple sized and shaped holes in a structural member combination comprising:

a structural member having a hole with edges therein;

a face flange larger than said hole in said structural member;

a tubular projection extending from said face flange and adapted to project through said hole in said structural member;

a passageway extending through said tubular projection through which electrical wires may be passed and be protected from said edges of said hole in said structural member;

a backing flange larger than said hole in said structural member for attachment to said tubular projection and resist the withdrawal of said tubular projection from said hole in said structural member said backing flange being sufficiently flexible that it can be elastically deformed to permit said backing flange to pass through said hole in said structural member;

a hole in said backing flange adapted to couple to said tubular projection;

a locking mechanism to lock said backing flange and said tubular projection together; and a hinge connecting said face flange and said backing flange together with said hinge being folded and at least partially passing through said hole in said structural member.

2. The combination of claim 1 wherein said locking mechanism includes:

a plurality of ramp lugs formed on the lateral periphery of said tubular projection each said ramp lug being resiliently deformable relative to said tubular projection, and said face flange and said backing flange adapted to be locked in parallel, spaced relation by insertion of said ramp lugs into said hole in said backing flange.

3. The combination as claimed in claim 2 wherein:

each said ramp lug comprises a resilient portion and a ramp portion.

4. The combination as claimed in claim 3 wherein:

each said ramp portion defines a respective cam surface.

5. The combination as claimed in claim 4 wherein:

at least one of said ramp lugs is surrounded by a marginal slot in said tubular projection.

6. The combination as claimed in claim 5 wherein:

at least said backing flange has a generally polygonal configuration with rounded edges.

* * * * *